United States Patent
Zhang et al.

(10) Patent No.: US 11,748,890 B2
(45) Date of Patent: Sep. 5, 2023

(54) INSTANCE SEGMENTATION METHOD AND SYSTEM FOR ENHANCED IMAGE, AND DEVICE AND MEDIUM

(71) Applicant: INSPUR SUZHOU INTELLIGENT TECHNOLOGY CO., LTD., Jiangsu (CN)

(72) Inventors: Runze Zhang, Jiangsu (CN); Baoyu Fan, Jiangsu (CN); Yaqian Zhao, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/011,135

(22) PCT Filed: May 27, 2021

(86) PCT No.: PCT/CN2021/096542
§ 371 (c)(1),
(2) Date: Dec. 16, 2022

(87) PCT Pub. No.: WO2022/037170
PCT Pub. Date: Feb. 24, 2022

(65) Prior Publication Data
US 2023/0177695 A1    Jun. 8, 2023

(30) Foreign Application Priority Data
Aug. 21, 2020   (CN) .......................... 202010846608.1

(51) Int. Cl.
*G06T 7/11*    (2017.01)
*G06V 10/77*   (2022.01)
(Continued)

(52) U.S. Cl.
CPC ................ *G06T 7/11* (2017.01); *G06T 5/001* (2013.01); *G06V 10/764* (2022.01); *G06V 10/7715* (2022.01); *G06T 2207/20081* (2013.01)

(58) Field of Classification Search
CPC . G06T 7/11; G06T 5/001; G06T 2207/20081; G06V 10/764; G06V 10/7715
See application file for complete search history.

(56) References Cited

U.S. PATENT DOCUMENTS 10,424,064 B2 *    9/2019   Price .......................... G06T 7/11
2018/0108137 A1 *  4/2018   Price .......................... G06T 7/11
(Continued)

FOREIGN PATENT DOCUMENTS

CN    109446889 A    3/2019
CN    110472594 A    11/2019
(Continued)

OTHER PUBLICATIONS

Badrinarayanan, V. et al. "segNet: A Deep Convolutional Encocer-Decoder Architecture for Scene Segmentation" IEEE Transactions on Pattern Analysis and Machine Intelligence, vol. 39, No. 12, Dec. 2017, pp. 1-15.*

(Continued)

*Primary Examiner* — Mia M Thomas
(74) *Attorney, Agent, or Firm* — IPRO, PLLC (57) ABSTRACT

A method includes: setting, in a main training network, an auxiliary training network having the same architecture as the main training network, performing data enhancement on an original image to obtain an enhanced image; inputting the original image into the main training network, inputting the enhanced image into the auxiliary training network; determining whether an intersection-over-union value of a second prediction frame generated by the auxiliary training network (Continued)

and a target frame is greater than an intersection-over-union value of a first prediction frame generated by the main training network and the target frame; and in response to the intersection-over-union value of the second prediction frame and the target frame being greater than the intersection-over-union value of the first prediction frame and the target frame, replacing the intersection-over-union value of the first prediction frame and the target frame with the intersection-over-union value of the second prediction frame and the target frame.

17 Claims, 3 Drawing Sheets

(51) Int. Cl.
*G06V 10/764* (2022.01)
*G06T 5/00* (2006.01)

(56) References Cited

U.S. PATENT DOCUMENTS

| | | | | |
|---|---|---|---|---|
| 2019/0164322 | A1* | 5/2019 | Kong | G06T 7/11 |
| 2019/0311202 | A1* | 10/2019 | Lee | G06T 9/002 |
| 2019/0377047 | A1* | 12/2019 | Chen | G01R 33/5608 |
| 2020/0019794 | A1 | 1/2020 | Engelcke et al. | |
| 2020/0074661 | A1* | 3/2020 | Anisimovskiy | H04N 13/128 |
| 2020/0117906 | A1* | 4/2020 | Lee | G06V 10/764 |
| 2021/0012154 | A1* | 1/2021 | Ge | G06V 10/454 |
| 2021/0097325 | A1* | 4/2021 | Tian | G06T 7/11 |
| 2021/0158089 | A1* | 5/2021 | Nagai | G06V 10/25 |
| 2021/0326617 | A1* | 10/2021 | Feng | G06F 18/2433 |
| 2021/0326638 | A1* | 10/2021 | Lee | G06V 20/46 |
| 2022/0027659 | A1* | 1/2022 | LeGendre | G06T 15/506 |
| 2022/0156944 | A1* | 5/2022 | Zhang | G06T 7/20 |
| 2022/0198695 | A1* | 6/2022 | Luo | G06V 20/64 |
| 2022/0309779 | A1* | 9/2022 | Wang | G06N 3/08 |
| 2023/0118401 | A1* | 4/2023 | Xu | G06V 20/41 |
| | | | | 382/103 |

FOREIGN PATENT DOCUMENTS

| | | |
|---|---|---|
| CN | 110738125 A | 1/2020 |
| CN | 110807422 A | 2/2020 |
| CN | 110910334 A | 3/2020 |
| CN | 111462009 A | 7/2020 |
| CN | 112132832 A | 12/2020 |

OTHER PUBLICATIONS

Hariharan, B. et al. "Hypercolumns for object segmentation and fine-grained localization" Proceedings of the IEEE Conference on Computer Vision and Pattern Recognition. (2015) pp. 447-456.*
PCT/CN2021/096542 international search report.

* cited by examiner

INSTANCE SEGMENTATION METHOD AND SYSTEM FOR ENHANCED IMAGE, AND DEVICE AND MEDIUM

The present disclosure claims the priority of the Chinese patent application filed on Aug. 21, 2020 before the CNIPA, China National Intellectual Property Administration with the application number of 202010846608.1 and the title of "INSTANCE SEGMENTATION METHOD AND SYSTEM FOR ENHANCED IMAGE, AND DEVICE AND MEDIUM", which is incorporated herein in its entirety by reference.

FIELD

The present disclosure relates to the technical field of target detection and more particularly, to a method and system for enhanced image instance segmentation, a computer device, and a computer-readable medium.

BACKGROUND

Instance segmentation is a field developed from target detection technologies and is more difficult than target detection because it requires to segment pixels of an object based on target detection. Moreover, the instance segmentation is also very different from semantic segmentation. The semantic segmentation only classifies pixel points in an image, and different instances of the same object do not need to be segmented. The instance segmentation may be regarded as a combination of the target detection and the semantic segmentation, so the research difficulty is correspondingly improved.

Now the commonly used instance segmentation algorithm is mask region-convolutional neural networks (Mask RCNN, a network for target detection and instance segmentation tasks) algorithm. The Mask RCNN adds a new branch to faster region-convolutional neural networks (Faster RCNN, a target detection network) for pixel-level prediction. This branch outputs binary masks indicating whether a pixel belongs to the target object or not. These masks is combined with classification results and detection boxes to achieve instance segmentation. From the perspective of network structures, the Mask RCNN adds only a branch to the Faster RCNN, hence the problem of an unbalanced distribution of training samples in the Faster RCNN still exists in the Mask RCNN. Therefore, a solution to the problem of the unbalanced distribution of training samples is desirable.

SUMMARY

In view of the above, it is an object of the embodiments of the present disclosure to provide a method and system for enhanced image instance segmentation, a computer device and a computer-readable storage medium, where with an auxiliary branch added, a larger intersection over union value of the prediction bounding box and the target bounding box is used to segment an instance, thereby greatly reducing the impact of sample imbalance; a feature map exchange strategy is proposed to enhance the robustness of the network; an auxiliary branch loss and a Kullback-Leibler (KL) divergence loss are added to further enhance performance of the instance segmentation.

To achieve the object, in one aspect of the embodiments of the present disclosure, a method for enhanced image instance segmentation is provided, including: setting an auxiliary training network with an identical architecture to a main training network in the main training network, and performing data enhancement on an original image to obtain an enhanced image; inputting the original image into the main training network, and inputting the enhanced image into the auxiliary training network; determining whether an intersection over union value of a second prediction bounding box generated by the auxiliary training network and a target bounding box is greater than an intersection over union value of a first prediction bounding box generated by the main training network and the target bounding box; and replacing the intersection over union value of the first prediction bounding box and the target bounding box with the intersection over union value of the second prediction bounding box and the target bounding box in response to the intersection over union value of the second prediction bounding box and the target bounding box being greater than the intersection over union value of the first prediction bounding box and the target bounding box, so as to conduct image instance segmentation.

In some embodiments, performing data enhancement on an original image to obtain an enhanced image comprises: displacing a coordinate bounding box of the original image by a preset distance.

In some embodiments, the method further includes: generating a multi-scale first semantic feature map based on the main training network, generating a multi-scale second semantic feature map based on the auxiliary training network, and exchanging the first semantic feature map and the semantic second feature map of the same scales with a predetermined probability.

In some embodiments, the method further includes: adding a main branch loss of the main training network and an auxiliary branch loss of the auxiliary training network to the image instance segmentation.

In some embodiments, adding a main branch loss of the main training network and an auxiliary branch loss of the auxiliary training network to the image instance segmentation comprises: combining an initial coordinate bounding box with the first semantic feature map to obtain a first classification feature map, combining the initial coordinate bounding box with the second semantic feature map to obtain a second classification feature map, and acquiring a divergence loss according to the first classification feature map and the second classification feature map.

In some embodiments, acquiring a divergence loss according to the first classification feature map and the second classification feature map comprises: calculating a sub-divergence loss of the first classification feature map and the second classification feature map of the same scales, and adding up the sub-divergence losses of all the scales to obtain the divergence loss.

In some embodiments, adding a main branch loss of the main training network and an auxiliary branch loss of the auxiliary training network to the image instance segmentation comprises: obtaining a main regression loss and an auxiliary regression loss according to information of a distance and scale of a coordinate bounding box.

In another aspect of the embodiments of the present disclosure, a system for enhanced image instance segmentation, comprising: an enhancement module configured to set an auxiliary training network with an identical architecture to a main training network in the main training network, and perform data enhancement on an original image to obtain an enhanced image; an input module configured to input the original image into the main training network, and input the enhanced image into the auxiliary training network; a determination module configured to determine whether an intersection over union value of a second prediction bounding box generated by the auxiliary training network and a target bounding box is greater than an intersection over union value of a first prediction bounding box generated by the main training network and the target bounding box; and an execution module configured to replace the intersection over union value of the first prediction bounding box and the target bounding box with the intersection over union value of the second prediction bounding box and the target bounding box in response to the intersection over union value of the second prediction bounding box and the target bounding box being greater than the intersection over union value of the first prediction bounding box and the target bounding box, so as to conduct image instance segmentation.

In yet another aspect of the embodiments of the present disclosure, a computer device is also provided, including: at least one processor; and a memory having processor-executable computer instructions stored thereon to implement the operations of the above method.

In yet another aspect of the embodiments of the present disclosure, a computer-readable storage medium is also provided, storing a computer program thereon, when executed by a processor, implements the operations of the above method.

The present disclosure is advantageous in that: with an auxiliary branch added, a greater intersection over union value of the prediction bounding box and the target bounding box is used to segment an instance, thereby greatly reducing the impact of sample imbalance; a feature map exchange strategy is proposed to enhance the robustness of the network; the auxiliary branch loss and the KL divergence loss are added to further enhance the performance of the instance segmentation.

BRIEF DESCRIPTION OF THE DRAWINGS

In order to more clearly explain the embodiments of the present disclosure or the technical solutions in the prior art, the following will briefly introduce the drawings needed to be used in the embodiments or the prior technical description. Obviously, the drawings in the following description are only some embodiments of the present disclosure. For ordinary technicians in the field, they may also obtain other embodiments according to these drawings without paying creative labor.

DETAILED DESCRIPTION

In order to make the purpose, technical solutions and advantages of the present disclosure clearer, the embodiments of the present disclosure are further described in detail below in combination with specific embodiments and with reference to the drawings.

It should be noted that all expressions of "first" and "second" in the embodiments of the present disclosure are used to distinguish two entities with the same name but not the same or different parameters. It shows that "first" and "second" are only for the convenience of expression, and should not be understood as limiting the embodiments of the present disclosure, and subsequent embodiments will not explain them one by one.

Figure 1:
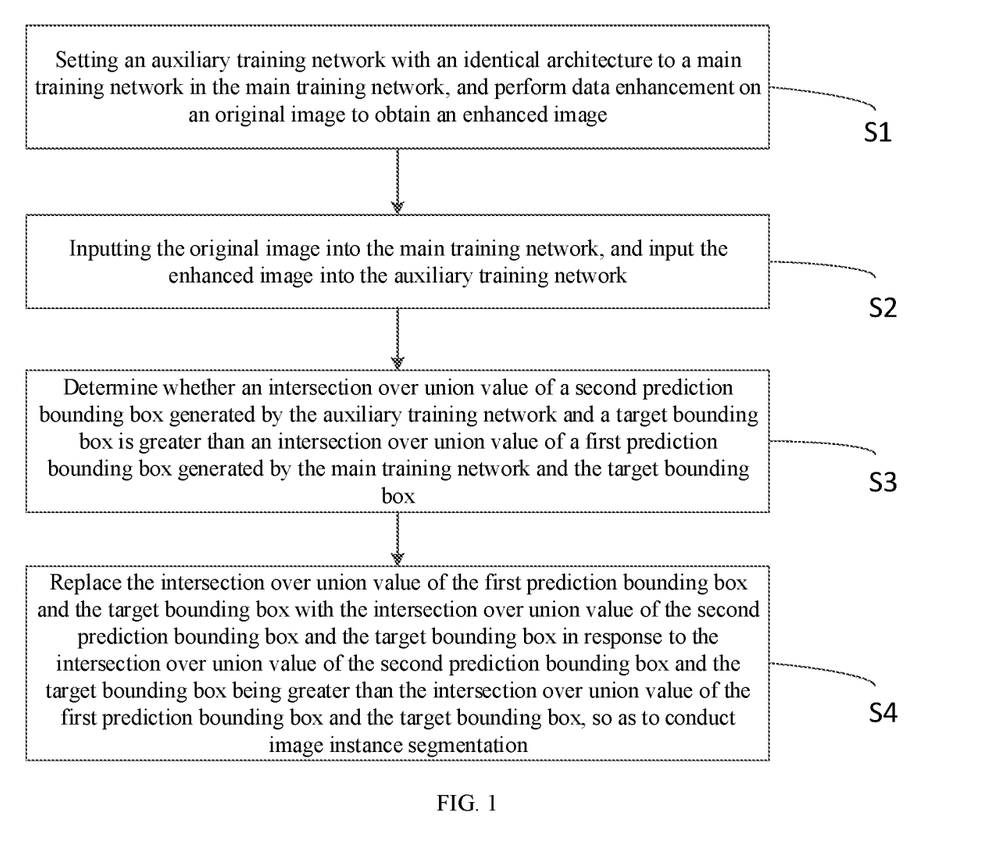
FIG. 1 is a schematic diagram of an embodiment of a method for enhanced image instance segmentation provided by the present disclosure.

In view of the above object, in a first aspect of the embodiments of the present disclosure, an embodiment of a method for enhanced image instance segmentation is provided. FIG. 1 is a schematic diagram of the embodiment of the method for enhanced image instance segmentation provided by the present disclosure. As shown in FIG. 1, an embodiment of the present disclosure includes operations of:

S1, setting an auxiliary training network with an identical architecture to a main training network in the main training network, and performing data enhancement on an original image to obtain an enhanced image;

S2, inputting the original image into the main training network, and inputting the enhanced image into the auxiliary training network;

S3, determining whether an intersection over union value of a second prediction bounding box generated by the auxiliary training network and a target bounding box is greater than an intersection over union value of a first prediction bounding box generated by the main training network and the target bounding box; and S4, replacing the intersection over union value of the first prediction bounding box and the target bounding box with the intersection over union value of the second prediction bounding box and the target bounding box in response to the intersection over union value of the second prediction bounding box and the target bounding box being greater than the intersection over union value of the first prediction bounding box and the target bounding box, so as to conduct image instance segmentation.

The embodiment of the present disclosure is illustrated by taking the Mask RCNN as an example, which is not intended to limit the type of training networks, and other training networks may be used in other embodiments. A network framework of the Mask RCNN is composed of a backbone network, a Region Proposal Network (RPN), and a Head network. Firstly, an input image is passed through the backbone network to obtain a semantic feature map with semantic information. The semantic feature map is passed through the RPN to get an initial candidate coordinate bounding box. The initial coordinate bounding box is combined with the semantic feature map output from the backbone network to obtain a classification feature map needed for specific classification regression. Newly generated classification feature maps may be passed through different Head networks to accomplish different tasks. For example, the type of the candidate bounding box may be determined by inputting the classification feature map into a classification network, the candidate bounding box may be located by inputting the classification feature map into a regression network, and pixel-level segmentation may be performed on the instances in the candidate bounding box by inputting the classification feature map into a segmentation network.

A selection of positive and negative samples is necessary before the tasks of classification, regression and segmentation are finally performed, and the positive and negative samples are determined according to an intersection over union (IoU) of the candidate bounding box and a ground-truth bounding box, and random sampling is adopted for the selection of the candidate bounding box in the Mask RCNN. The distribution of samples is not uniform in terms of the IoU of the prediction bounding box and the target bounding box. Random sampling, when generating the candidate bounding box, causes a background bounding box to be much larger than the ground-truth bounding box, so that the region of the target object takes up only a small part, while the background takes up most positions. As a result, most of the samples crowd in a range where the IoU is from 0 to 0.05, which leads to a sampling imbalance for the samples.

In the embodiment of the present disclosure, this problem is addressed by designing an auxiliary branch to segment with a large IoU. Adding the auxiliary branches to some extent leads to training instability, and in order to alleviate this problem, feature map exchange is proposed in the embodiment of the present disclosure to enhance the generalization ability of the model. In the embodiment of the present disclosure, an auxiliary branch loss is added, and a Kullback-Leibler (KL) divergence loss is also added to the main branch and auxiliary branches to further improve the accuracy of the instance segmentation.

The auxiliary training network with an identical architecture to the main training network is set in the main training network, and data enhancement is performed on the original image to obtain the enhanced image. In some embodiments, performing data enhancement on the original image to obtain the enhanced image includes: displacing a coordinate bounding box of the original image by a preset distance. Because of the large displacement of the coordinate bounding box in the image with respect to the original image, the IOU of a detection bounding box during training process will be increased with respect to the ground-truth bounding box of the original image.

The original image is input to the main training network and the enhanced image is input to the auxiliary training network. A determination is made as to whether an intersection over union value of a second prediction bounding box generated by the auxiliary training network and a target bounding box is greater than an intersection over union value of a first prediction bounding box generated by the main training network and the target bounding box. The intersection over union value of the second prediction bounding box and the target bounding box is used to replace the intersection over union value of the first prediction bounding box and the target bounding box in response to the intersection over union value of the second prediction bounding box and the target bounding box being greater than the intersection over union value of the first prediction bounding box and the target bounding box, so as to conduct image instance segmentation.

In some embodiments, the method further includes: generating a multi-scale first semantic feature map based on the main training network, generating a multi-scale second semantic feature map based on the auxiliary training network, and exchanging the first semantic feature map and the semantic second feature map of the same scales with a predetermined probability. Since a new branch is introduced and the resulting feature map is a feature enhancement relative to the original feature map, a feature map exchange module is introduced between the main training network and the auxiliary training network according to the embodiment of the present disclosure to further enhance the robustness of the enhanced model. In some embodiments, the module may be added between the backbone network and a Feature Pyramid Network (FPN). Since the backbone network of each branch generates feature maps of four scales, the feature map exchange module exchange on feature layers of the same scales with a certain probability. For example, the main training network generates the feature maps of four scales, i.e., A1, A2, A3 and A4, and the auxiliary training network generates the feature maps of four scales, i.e., B1, B2, B3 and B4, hence the feature maps of the scales A1 and B1 may be exchanged with a certain probability.

In some embodiments, the method further includes: adding a main branch loss of the main training network and an auxiliary branch loss of the auxiliary training network to the image instance segmentation. The overall network structure includes the main branch loss and the auxiliary branch loss, where the main branch loss and the auxiliary branch loss are both a classification loss and a regression loss; the classification loss uses a cross-entropy loss, and the regression loss uses an IoU loss. In the embodiment of the present disclosure, the KL divergence losses of the main branch and auxiliary branch are introduced to learn the similarity of the two branches.

In some embodiments, adding a main branch loss of the main training network and an auxiliary branch loss of the auxiliary training network to the image instance segmentation includes: combining an initial coordinate bounding box with the first semantic feature map to obtain a first classification feature map, combining the initial coordinate bounding box with the second semantic feature map to obtain a second classification feature map, and acquiring a divergence loss according to the first classification feature map and the second classification feature map.

In some embodiments, acquiring a divergence loss according to the first classification feature map and the second classification feature map includes: calculating a sub-divergence loss of the first classification feature map and the second classification feature map of the same scales, and adding up the sub-divergence losses of all the scales to obtain the divergence loss. Since the FPN outputs features of five scales, one KL divergence loss is calculated for the feature of each scale. The resulting KL divergence loss is a sum of the KL divergence losses of the five scales. The equation for calculating the KL divergence, denoted as $D_{KL}$, is as follows, where p and q represent the feature maps of the main branch and the auxiliary branch, respectively, and $x_i$ represents an i-th scale.

$$D_{KL}(p\|q) = \sum_{i=1}^{N} p(x_i) \log\left(\frac{p(x_i)}{q(x_i)}\right)$$

In some embodiments, adding a main branch loss of the main training network and an auxiliary branch loss of the auxiliary training network to the image instance segmentation includes: obtaining a main regression loss and an auxiliary regression loss, respectively, according to information of a distance and scale of the coordinate bounding box.

The current mainstream regression loss is the Smooth L1 Loss (a regression loss function). Although a situation where the error grows too fast is alleviated to some extent, the loss function is not completely equivalent to the concept of IoU. Moreover, the Smooth L1 loss is very sensitive to the scale, hence in this embodiment, an improved IoU loss is taken as the regression loss.

A conventional IoU Loss is calculated as in the following equation, where p denotes a prediction bounding box and g denotes ground truth. Intersection denotes an intersection of the prediction bounding box and the ground-truth bounding box, and Union denotes a union of the prediction bounding box and the ground-truth bounding box:

$$IoU \cdot Loss = -\ln \frac{\text{Intersection}(p,g)}{\text{Union}(p,g)}$$

However, in the above equation, a case where there is no intersection between the prediction bounding box and the ground-truth bounding box is not considered, so it is not easy to converge. In the embodiment of the present disclosure, a new IoU loss ($New_{Loss}$) is designed in this case by adding information of the distance and scale of the coordinate bounding box so that the regression loss is more easily to converge. The detailed equation is as follows:

$$New_{Loss} = 1 - \frac{\text{Intersection}(p,g)}{\text{Union}(p,g)} + \frac{d(p_c, g_c)}{c}$$

$P_c$ is a coordinate of a center point of the prediction bounding box, and $g_c$ is a coordinate of a center point of the ground-truth bounding box. c is a diagonal distance of a minimum closure of the prediction bounding box and the ground-truth target bounding box.

For model training, pytorch (a currently prevailing deep learning framework), torchvision (a deep learning model library), and mmdetection (a target detection framework) are employed in the embodiment of the present disclosure. The auxiliary branch of the embodiment of the present disclosure only works during the training process, and only the main branch is used in a test, hence parameters in an inference stage are identical to those of the Mask RCNN network.

The experimental environment and experimental parameters of this embodiment are as follows.

This embodiment is implemented in an experimental environment having 8 V100 graphics processing units (GPUs), and the database in use is common objects in context (COCO, a target detection data set) data set. The number of images that may be processed per GPU is 2, and an initial learning rate is 0.02. During training, horizontal flipping is used for the data enhancement, with a short side set as 800 and a long side set as 1333 for an image. In the test, a soft non maximum suppression (Soft-NMS, an improved NMS algorithm) method is not used for a fair comparison.

The data set results of the COCO Test-2017 are as follows.

|  | $AP_{SEG}$ | $AP_{BBOX}$ |
|---|---|---|
| Mask RCNN (ResNet50) | 34.2 | 37.3 |
| +Auxiliary Branch | 35.4 | 38.5 |
| +Feature Map Exchange | 36.0 | 39.2 |
| +KL Divergence Loss | 36.6 | 40.1 |

$AP_{SEG}$ represents a segmentation performance value, and $AP_{BBOX}$ represents a coordinate bounding box performance value. As shown in the above table, in the case of using the prior art, the segmentation performance value is 34.2 and the coordinate bounding box performance value is 37.3; with the auxiliary branch added, the segmentation performance value rises to 35.4 and the coordinate bounding box performance value rises to 38.5; after the feature map exchange, the segmentation performance value further rises to 36.0 and the coordinate bounding box performance value further rises to 39.2; and with the KL divergence loss introduced, the segmentation performance value further rises to 36.6 and the coordinate bounding box performance value further rises to 40.1. From the above experimental results, the embodiment of the present disclosure has a great improvement in the overall performance of the model, with a 2.4-point improvement in the underlying network structure.

It should be particularly noted that the above-mentioned various operations in the various embodiments of the method for enhanced image instance segmentation may be implemented alternately, replaced with each other, deleted, or added additional operations. Therefore, reasonable variations and combinations made to the method for enhanced image instance segmentation shall also fall within the scope of the present disclosure, and the scope of the present disclosure should not be limited to the embodiments.

Figure 2:
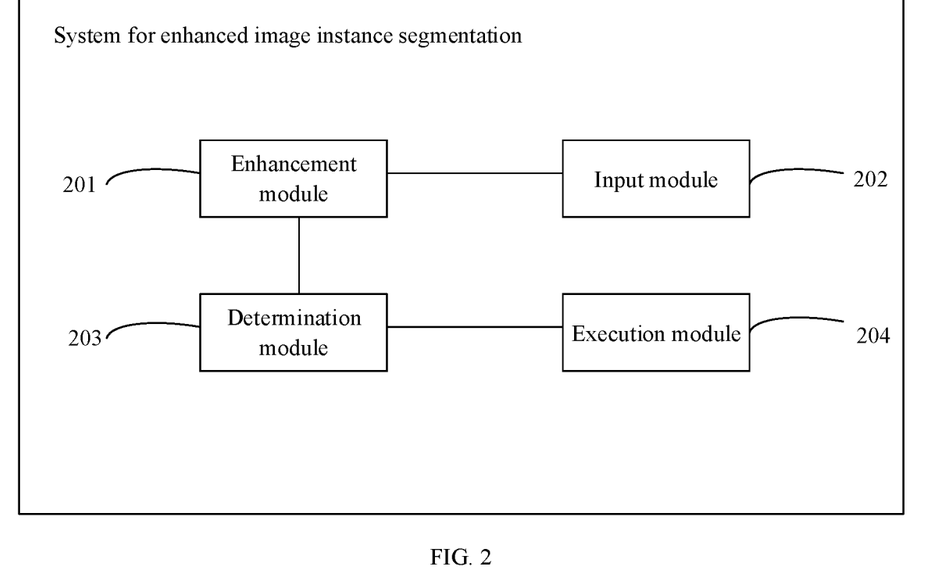
FIG. 2 is a structure diagram of a system for enhanced image instance segmentation provided by the present disclosure.

In view of the above object, in a second aspect of the embodiments of the present disclosure, a system for enhanced image instance segmentation is provided, as shown in FIG. 2, including: an enhancement module 201 configured to set an auxiliary training network with an identical architecture to a main training network in the main training network, and perform data enhancement on an original image to obtain an enhanced image; an input module 202 configured to input the original image into the main training network, and input the enhanced image into the auxiliary training network; a determination module 203 configured to determine whether an intersection over union value of a second prediction bounding box generated by the auxiliary training network and a target bounding box is greater than an intersection over union value of a first prediction bounding box generated by the main training network and the target bounding box; and an execution module 204 configured to replace the intersection over union value of the first prediction bounding box and the target bounding box with the intersection over union value of the second prediction bounding box and the target bounding box in response to the intersection over union value of the second prediction bounding box and the target bounding box being greater than the intersection over union value of the first prediction bounding box and the target bounding box, so as to conduct image instance segmentation.

In some embodiments, the enhancement module 201 is configured to: displace a coordinate bounding box of the original image by a preset distance.

In some embodiments, the system further includes: an exchange module configured to generate a multi-scale first semantic feature map based on the main training network, generate a multi-scale second semantic feature map based on the auxiliary training network, and exchange the first semantic feature map and the semantic second feature map of the same scales with a predetermined probability.

In some embodiments, the system further includes: a loss module configured to add a main branch loss of the main training network and an auxiliary branch loss of the auxiliary training network to the image instance segmentation.

In some embodiments, the loss module is configured to: combine an initial coordinate bounding box with the first semantic feature map to obtain a first classification feature map, combine the initial coordinate bounding box with the second semantic feature map to obtain a second classification feature map, and acquire a divergence loss according to the first classification feature map and the second classification feature map.

In some embodiments, the loss module is configured to: calculate a sub-divergence loss of the first classification feature map and the second classification feature map of the same scales, and add up the sub-divergence losses on all the scales to obtain the divergence loss.

In some embodiments, the loss module is configured to: obtain a main regression loss and an auxiliary regression loss, respectively, according to information of the distance and scale of the coordinate bounding box.

In view of the above object, in a third aspect of the embodiments of the present disclosure, a computer device is provided, including: at least one processor; and a memory having processor-executable computer instructions stored thereon to implement the operations of: S1, setting an auxiliary training network with an identical architecture to a main training network in the main training network, and performing data enhancement on an original image to obtain an enhanced image; S2, inputting the original image into the main training network, and inputting the enhanced image into the auxiliary training network; S3, determining whether an intersection over union value of a second prediction bounding box generated by the auxiliary training network and a target bounding box is greater than an intersection over union value of a first prediction bounding box generated by the main training network and the target bounding box; and S4, replacing the intersection over union value of the first prediction bounding box and the target bounding box with the intersection over union value of the second prediction bounding box and the target bounding box in response to the intersection over union value of the second prediction bounding box and the target bounding box being greater than the intersection over union value of the first prediction bounding box and the target bounding box, so as to conduct image instance segmentation.

In some embodiments, performing data enhancement on the original image to obtain the enhanced image includes: displacing a coordinate bounding box of the original image by a preset distance.

In some embodiments, the instructions are executed by the processor to further implement the operations of: generating a multi-scale first semantic feature map based on the main training network, generating a multi-scale second semantic feature map based on the auxiliary training network, and exchanging the first semantic feature map and the semantic second feature map on the same scales with a predetermined probability.

In some embodiments, the instructions are executed by the processor to further implement the operations of: adding a main branch loss of the main training network and an auxiliary branch loss of the auxiliary training network to the image instance segmentation.

In some embodiments, adding a main branch loss of the main training network and an auxiliary branch loss of the auxiliary training network to the image instance segmentation include: combining an initial coordinate bounding box with the first semantic feature map to obtain a first classification feature map, combining the initial coordinate bounding box with the second semantic feature map to obtain a second classification feature map, and acquiring a divergence loss according to the first classification feature map and the second classification feature map.

In some embodiments, acquiring a divergence loss according to the first classification feature map and the second classification feature map includes: calculating a sub-divergence loss of the first classification feature map and the second classification feature map of the same scales, and adding up the sub-divergence losses of all the scales to obtain the divergence loss.

In some embodiments, adding a main branch loss of the main training network and an auxiliary branch loss of the auxiliary training network to the image instance segmentation includes: obtaining a main regression loss and an auxiliary regression loss, respectively, according to information of the distance and scale of the coordinate bounding box.

Figure 3:
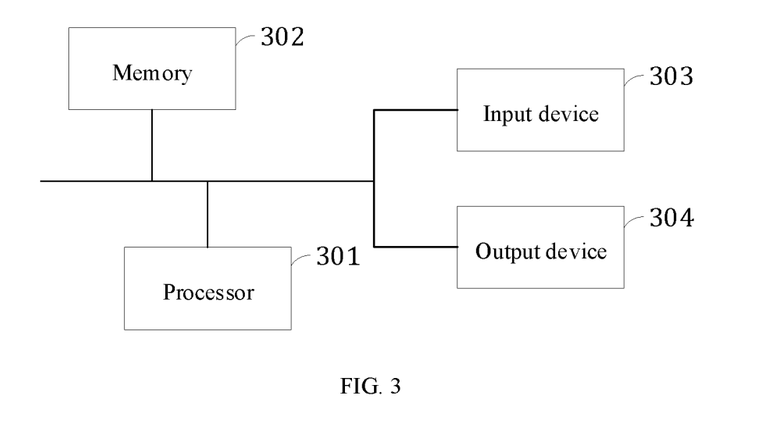
FIG. 3 is a hardware architecture schematic diagram of an embodiment of a computer device for enhanced image instance segmentation provided by the present disclosure.

As shown in FIG. 3, a hardware architecture diagram of an embodiment of the computer device for enhanced image instance segmentation described above is provided according to the present disclosure.

Taking the device shown in FIG. 3 as an example, the device includes a processor 301 and a memory 302, and may further include an input device 303 and an output device 304.

The processor 301, the memory 302, the input device 303, and the output device 304 may be connected via a bus or otherwise, as exemplified in FIG. 3 via a bus connection.

The memory 302 is a non-volatile computer-readable storage medium operable to store non-volatile software programs, non-volatile computer-executable programs, and modules, such as program instructions/modules, corresponding to the method for enhanced image instance segmentation in the embodiments of the present application. The processor 301 executes various functional applications of the server and data processing by running the non-volatile software programs, instructions, and modules stored in the memory 302, that is, to implement the method for enhanced image instance segmentation as described above in the process embodiments.

The memory 302 may include a program storage partition and a data storage partition, the program storage partition may store an operating system and an application program required by at least one function; the storage data partition may store data created according to the use of the method for enhanced image instance segmentation, etc. In addition, the memory 302 may include a high-speed random-access memory and a non-volatile memory, such as at least one magnetic disk storage device, flash memory device, or other non-volatile solid state storage devices. In some embodiments, the memory 302 may include a memory remotely located with respect to the processor 301, and these remote memories may be connected to a local module via a network. Examples of such a network include, but are not limited to, the Internet, intranets, local area networks, mobile communication networks, and combinations thereof.

The input device 303 may receive information such as an input username and password. The output device 304 may include a display device such as a display screen.

One or more program instructions/modules corresponding to the method for enhanced image instance segmentation are stored in the memory 302 and, when executed by processor 301, implement the method for enhanced image instance segmentation in any of the process embodiments described above.

Any of the embodiments of the computer device implementing the method for enhanced image instance segmentation described above may achieve the same or similar effects as any of the previously described process embodiments corresponding thereto.

Figure 4:
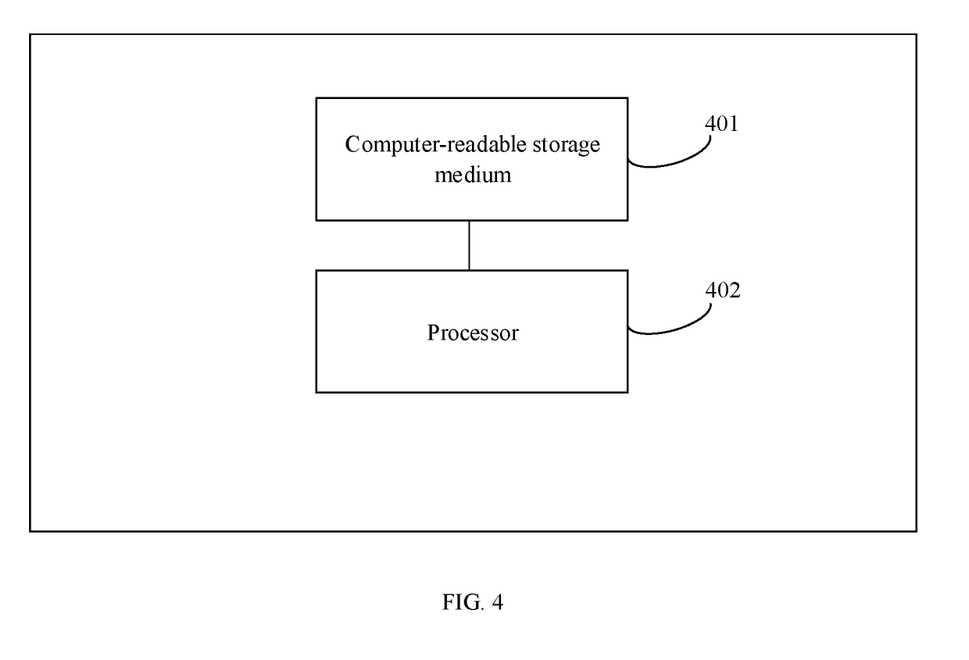
FIG. 4 is a schematic diagram of a computer-readable storage medium provided by the present disclosure.

As shown in FIG. 4, the present disclosure further provides a computer-readable storage medium 401 storing a computer program thereon, when executed by a processor 402, implements the method as described above.

Finally, it needs to be noted that those skilled in the art may understand the realization of all or part of the processes in the above embodiment methods, and may be completed by instructing related hardware through a computer program. The program to enhance the method of image instance segmentation may be stored in a computer-readable storage medium. When the program is executed, it may include the processes of the embodiments of the above methods. The storage medium of the program may be disk, optical disk, read only memory (ROM) or random access memory (RAM). The embodiments of the above computer programs may achieve the same or similar effects as the corresponding embodiments of any of the above methods.

The above is an exemplary embodiment of the present disclosure, but it should be noted that various changes and modifications may be made without departing from the scope of the embodiments disclosed in the claims. The functions, operations and/or actions of the method claims according to the disclosed embodiments described herein need not to be performed in any particular order. In addition, although the elements disclosed in the embodiments of the present disclosure may be described or required in individual form, they may also be understood as multiple unless they are explicitly limited to the singular number.

It should be understood that, as used herein, the singular form "a" is intended to include the plural form as well, unless the context clearly supports exceptions. It should also be understood that "and/or" as used herein refers to any and all possible combinations including one or more items listed in association.

The above embodiments of the present disclosure disclose the serial number of the embodiments only for description and do not represent the advantages and disadvantages of the embodiments.

Those skilled in the art may understand that all or part of the operations to implement the above embodiments may be completed by hardware, or may be completed by instructing relevant hardware through programs. The programs may be stored in a computer-readable storage medium, which may be a read-only memory, a disk or an optical disk.

Those skilled in the art should understand that the discussion of any of the above embodiments is only illustrative and is not intended to imply that the scope of disclosure of embodiments of the present disclosure (including claims) is limited to these examples; under the idea of embodiments of the present disclosure, the above embodiments or the technical features in different embodiments may also be combined, and there are many other changes in different aspects of the above embodiments of the present disclosure, which are not provided in details for simplicity. Therefore, any omission, modification, equivalent replacement, improvement, etc. made within the spirit and principles of the embodiments of the present disclosure shall be included in the protection scope of the embodiments of the present disclosure.

The invention claimed is:

1. A method for enhanced image instance segmentation, comprising:
setting an auxiliary training network with an identical architecture to a main training network in the main training network, and performing data enhancement on an original image to obtain an enhanced image;
inputting the original image into the main training network, and inputting the enhanced image into the auxiliary training network;
determining whether an intersection over union value of a second prediction bounding box generated by the auxiliary training network and a target bounding box is greater than an intersection over union value of a first prediction bounding box generated by the main training network and the target bounding box; and
replacing the intersection over union value of the first prediction bounding box and the target bounding box with the intersection over union value of the second prediction bounding box and the target bounding box in response to the intersection over union value of the second prediction bounding box and the target bounding box being greater than the intersection over union value of the first prediction bounding box and the target bounding box, so as to conduct image instance segmentation;
wherein performing data enhancement on an original image to obtain an enhanced image comprises:
displacing a coordinate bounding box of the original image by a preset distance.

2. The method according to claim 1, further comprising:
generating a multi-scale first semantic feature map based on the main training network, generating a multi-scale second semantic feature map based on the auxiliary training network, and exchanging the first semantic feature map and the second semantic feature map of the same scales with a predetermined probability.

3. The method according to claim 2, further comprising:
adding a main branch loss of the main training network and an auxiliary branch loss of the auxiliary training network to the image instance segmentation.

4. The method according to claim 3, wherein adding a main branch loss of the main training network and an auxiliary branch loss of the auxiliary training network to the image instance segmentation comprises:
combining an initial coordinate bounding box with the first semantic feature map to obtain a first classification feature map, combining the initial coordinate bounding box with the second semantic feature map to obtain a second classification feature map, and acquiring a divergence loss according to the first classification feature map and the second classification feature map.

5. The method according to claim 4, wherein acquiring a divergence loss according to the first classification feature map and the second classification feature map comprises:
calculating a sub-divergence loss of the first classification feature map and the second classification feature map of the same scales, and adding up the sub-divergence losses of all the scales to obtain the divergence loss.

6. The method according to claim 5, wherein an equation for calculating the KL divergence, denoted as $D_{KL}$, is as follows:

$$D_{KL}(p\|q) = \sum_{i=1}^{N} p(x_i)\log\left(\frac{p(x_i)}{q(x_i)}\right)$$

where p and q represent the feature maps of the main branch and the auxiliary branch, respectively, and $x_i$ represents an i-th scale.

7. The method according to claim 4, further comprising:
inputting the first classification feature map or the second classification feature map into a classification network to determine a type of a candidate bounding box;
inputting the first classification feature map or the second classification feature map into a regression network to locate the candidate bounding box; and inputting the first classification feature map or the second classification feature map into a segmentation network to perform pixel-level segmentation on instances in the candidate bounding box.

8. The method according to claim 3, wherein adding a main branch loss of the main training network and an auxiliary branch loss of the auxiliary training network to the image instance segmentation comprises:
obtaining a main regression loss and an auxiliary regression loss according to information of a distance and scale of a coordinate bounding box.

9. The method according to claim 3, wherein the main branch loss and the auxiliary branch loss are both a classification loss and a regression loss; and
the classification loss uses a cross-entropy loss, and the regression loss uses an intersection over union loss.

10. The method according to claim 9, wherein an equation of the intersection over union loss is as follows:

$$New_{Loss} = 1 - \frac{\text{Intersection}(p,g)}{\text{Union}(p,g)} + \frac{d(p_c,g_c)}{c}$$

where Intersection represents an intersection of the prediction bounding box and the ground-truth bounding box, Union represents a union of the prediction bounding box and the ground-truth bounding box, $P_c$ is a coordinate of a center point of the prediction bounding box, $g_c$ is a coordinate of a center point of the ground-truth bounding box, and c is a diagonal distance of a minimum closure of the prediction bounding box and the ground-truth bounding box.

11. The method according to claim 1, wherein horizontal flipping is used for the data enhancement during training.

12. A computer device, comprising:
at least one processor; and
a memory having processor-executable computer instructions stored thereon, causes the processor to:
set an auxiliary training network with an identical architecture to a main training network in the main training network, and perform data enhancement on an original image to obtain an enhanced image;
input the original image into the main training network, and input the enhanced image into the auxiliary training network;
determine whether an intersection over union value of a second prediction bounding box generated by the auxiliary training network and a target bounding box is greater than an intersection over union value of a first prediction bounding box generated by the main training network and the target bounding box; and
replace the intersection over union value of the first prediction bounding box and the target bounding box with the intersection over union value of the second prediction bounding box and the target bounding box in response to the intersection over union value of the second prediction bounding box and the target bounding box being greater than the intersection over union value of the first prediction bounding box and the target bounding box, so as to conduct image instance segmentation; and further causing the processor to:
generate a multi-scale first semantic feature map based on the main training network, generate a multi-scale second semantic feature map based on the auxiliary training network, and exchange the first semantic feature map and the second semantic feature map of the same scales with a predetermined probability.

13. The computer device according to claim 12, wherein perform data enhancement on an original image to obtain an enhanced image comprises:
displacing a coordinate bounding box of the original image by a preset distance.

14. The computer device according to claim 12, further causing the processor to:
add a main branch loss of the main training network and an auxiliary branch loss of the auxiliary training network to the image instance segmentation.

15. A computer-readable storage medium, storing a computer program thereon, when executed by a processor, causes the processor to:
set an auxiliary training network with an identical architecture to a main training network in the main training network, and perform data enhancement on an original image to obtain an enhanced image;
input the original image into the main training network, and input the enhanced image into the auxiliary training network;
determine whether an intersection over union value of a second prediction bounding box generated by the auxiliary training network and a target bounding box is greater than an intersection over union value of a first prediction bounding box generated by the main training network and the target bounding box; and
replace the intersection over union value of the first prediction bounding box and the target bounding box with the intersection over union value of the second prediction bounding box and the target bounding box in response to the intersection over union value of the second prediction bounding box and the target bounding box being greater than the intersection over union value of the first prediction bounding box and the target bounding box, so as to conduct image instance segmentation; and
further causing the processor to:
generate a multi-scale first semantic feature map based on the main training network, generate a multi-scale second semantic feature map based on the auxiliary training network, and exchange the first semantic feature map and the second semantic feature map of the same scales with a predetermined probability.

16. The computer-readable storage medium according to claim 15, wherein perform data enhancement on an original image to obtain an enhanced image comprises:
displacing a coordinate bounding box of the original image by a preset distance.

17. The computer-readable storage medium according to claim 15, further causing the processor to:
add a main branch loss of the main training network and an auxiliary branch loss of the auxiliary training network to the image instance segmentation.

* * * * *